(12) United States Patent
Mass et al.

(10) Patent No.: US 9,266,731 B2
(45) Date of Patent: Feb. 23, 2016

(54) PROCESS FOR PRODUCTION OF SYNTHESIS GAS

(75) Inventors: Hans-Jurgen Mass, Dresden (DE); Volker Goke, Geretsried (DE); Otto Machhammer, Mannheim (DE); Marcus Guzmann, Munsing (DE); Christian Schneider, Mannheim (DE); Wolfgang Alois Hormuth, St. Martin (DE); Andreas Bode, Mannheim (DE); Dirk Klingler, Mannheim (DE); Matthias Kern, Karlsruhe (DE); Grigorios Kolios, Neustadt (DE)

(73) Assignee: LINDE AKTIENGESELLSCHAFT, Ludwigshafen (DE)

( * ) Notice: Subject to any disclaimer, the term of this patent is extended or adjusted under 35 U.S.C. 154(b) by 77 days.

(21) Appl. No.: 14/130,942

(22) PCT Filed: Jul. 5, 2012

(86) PCT No.: PCT/EP2012/002837
§ 371 (c)(1),
(2), (4) Date: Apr. 7, 2014

(87) PCT Pub. No.: WO2013/004391
PCT Pub. Date: Jan. 10, 2013

(65) Prior Publication Data
US 2014/0217327 A1 Aug. 7, 2014

(30) Foreign Application Priority Data

Jul. 5, 2011 (DE) .................... 10 2011 106 642

(51) Int. Cl.
*C01B 3/38* (2006.01)
*C01B 3/34* (2006.01)
*C01B 31/18* (2006.01)

(52) U.S. Cl.
CPC ............... *C01B 3/344* (2013.01); *C01B 31/18* (2013.01); *C01B 2203/0222* (2013.01); *C01B 2203/042* (2013.01); *C01B 2203/049* (2013.01); *C01B 2203/0425* (2013.01); *C01B 2203/085* (2013.01); *C01B 2203/0822* (2013.01); *C01B 2203/0872* (2013.01); *C01B 2203/1241* (2013.01)

(58) Field of Classification Search
CPC .............................................. C01B 2203/0872
See application file for complete search history.

(56) References Cited

U.S. PATENT DOCUMENTS 4,726,913 A 2/1988 Brophy et al.
5,647,877 A * 7/1997 Epstein .......................... 48/210
(Continued)

FOREIGN PATENT DOCUMENTS

EP 0191522 A2 8/1986

OTHER PUBLICATIONS

International Search Report dated Oct. 2, 2012 issued in corresponding PCT/EP2012/002837 application (pp. 1-3).

*Primary Examiner* — Melvin C Mayes
*Assistant Examiner* — Kenneth Vaden
(74) *Attorney, Agent, or Firm* — Millen, White, Zelano, Branigan, P.C.

(57) ABSTRACT

Process for the production of synthesis gas (3), in which methane and carbon dioxide (2) are introduced into a reaction space (R) and reacted in the presence of a solid (W) at elevated temperatures to give hydrogen and carbon monoxide. Methane and carbon dioxide are passed through a carbon-containing granular material (W) and reacted in a high-temperature zone (H).

19 Claims, 1 Drawing Sheet

(56) References Cited

U.S. PATENT DOCUMENTS

| | | |
|---|---|---|
| 6,284,214 B1 * | 9/2001 | Holcombe et al. ............ 423/563 |
| 7,658,776 B1 * | 2/2010 | Pearson ........................ 48/62 R |
| 2003/0182861 A1 | 10/2003 | Weimer et al. |
| 2003/0208959 A1 | 11/2003 | Weimer et al. |
| 2009/0133407 A1 * | 5/2009 | Sawyer .......................... 60/780 |
| 2009/0203519 A1 | 8/2009 | Abatzoglou et al. |
| 2010/0065782 A1 * | 3/2010 | Dierickx et al. .............. 252/373 |
| 2011/0089378 A1 | 4/2011 | Sato et al. |

\* cited by examiner

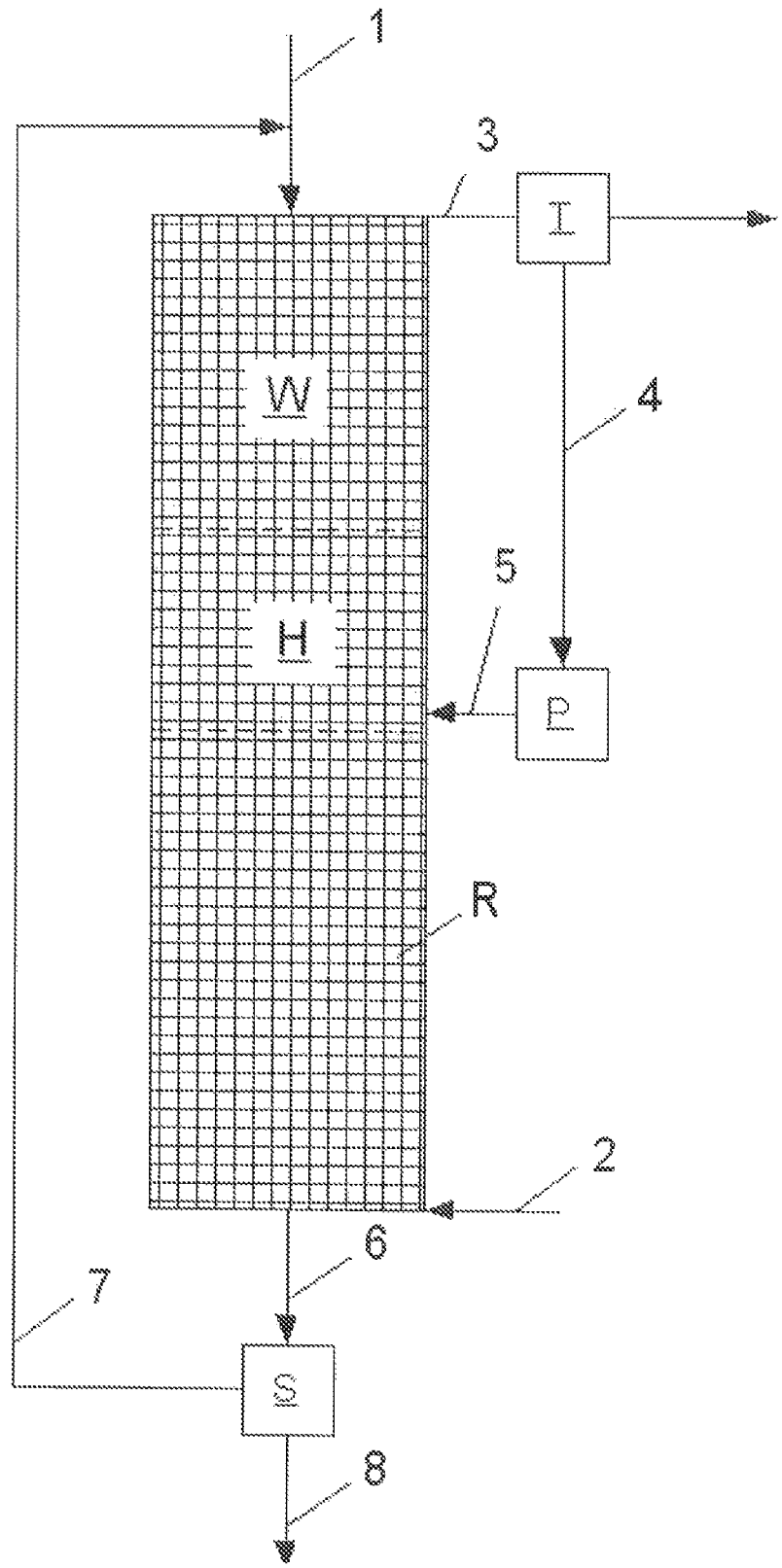

PROCESS FOR PRODUCTION OF SYNTHESIS GAS

The invention relates to a process for producing synthesis gas, where methane and carbon dioxide are introduced into a reaction chamber and are reacted in the presence of a solid to give hydrogen and carbon monoxide.

A synthesis gas is a composition consisting of hydrogen and carbon monoxide that can be used as a basic chemical in a multiplicity of industrial operations. Synthesis gas offers the ideal interface with existing petrochemical processes for the production of, for example, methanol, dimethyl ether or Fischer-Tropsch products.

Processes of these kinds are known from Patent Applications U.S.2009203519 and U.S.2011089378, for example. Both applications describe processes in which methane and carbon dioxide are passed over a catalyst and are reacted by dry reforming. Because of the Boudouard equilibrium and also the thermal decomposition of methane, carbon is formed, some of which settles on the catalysts and poisons it.

In order to counter this problem, U.S.2009203519 proposes the use of an iron-containing deposition catalyst on which carbon formed is deposited. The capacity of the deposition catalyst, however, is limited, and so at periodical intervals it is necessary to carry out catalyst regeneration, with the aid of a fluid, for example. U.S.2009203519 does not disclose a technical solution in relation to supply of heat for the strongly endothermic reforming reaction.

U.S.20110089378 describes the preparation of catalysts such as $BaCO_3$—$Ba_2TiO_4$ (1:1)/NiO (catalyst A), $Sr_2TiO_4$/NiO (catalyst B) and $BaCO_3$—$BaAl_2O_4$ (2:1)/NiO, for example, and also their application in the dry reforming of methane. The catalyst, which is resistant to coking over at least 8 hours, is suitable in principle for the realization of a continuous regime. This solution, however, is hampered by high catalyst costs.

In view of the disadvantages described above, it has not been possible to date, on the basis of the recited prior art, to develop industrial-scale production of synthesis gas through the reaction of methane with carbon dioxide.

It is an object of the present invention to specify a process for producing synthesis gas that uses methane and carbon dioxide as reactants. A further object of the invention is to obtain a gaseous product stream which is substantially free from particulate solids. An additional object of the invention is to specify a continuous regime for synthesis gas production that does not necessitate catalyst regeneration.

These objects are achieved in accordance with the invention by the reaction of methane and carbon dioxide in the presence of a carbon-containing solid.

The methane and carbon dioxide reactants are reacted preferably at temperatures between 800 to 1600° C. and more preferably between 900 and 1400° C.

The carbon-containing solid used in accordance with the invention is advantageously in the form of carbon-containing granules.

Carbon-containing granules in the present invention comprehend a material which consists advantageously of solid grains containing at least 50% by weight, preferably at least 80% by weight and more particularly at least 90% by weight carbon. The carbon-containing granules advantageously possess a grain size, i.e. an equivalent diameter, as determinable by sieving with a defined mesh size, of 0.5 to 100 mm, preferably of 1 to 80 mm. The carbon-containing granules are advantageously spherical. A multiplicity of different carbon-containing granules can be used in the process of the invention. Such granules may consist, for example, of charcoal, coke, coke breeze and/or mixtures thereof. Coke breeze generally has a grain size of smaller than 20 mm. The carbon-containing granules may further comprise 0% to 15% by weight, based on the total mass of the granules, preferably 0% to 5% by weight, of metal, metal oxide and/or ceramic. There is particular preference in using granules which comprise coke breeze and/or low-grade coke—that is, coke not directly suitable for the smelting operation, coking-plant coke based on brown coal or bituminous coal, and/or coke obtained from biomass.

It is advantageous to use 1 to 3 times the mass of carbon-containing solid by comparison with the mass of the synthesis gas produced, preferably 1.8 to 2.5 times the mass.

Advantageously at least 90% by weight of the carbon formed by the reaction of the invention, based on the total mass of the carbon formed, and preferably at least 95% by weight, is deposited on the carbon-containing solid, more particularly on the carbon-containing granules.

The gaseous product stream advantageously has a solids content of less than 10 mg solid/g gas, preferably of less than 5 mg solid/g gas, more particularly of less than 1 mg solid/g gas.

In the course of the implementation of the process of the invention, carbon that is formed does not constitute a problem, since it deposits predominantly on the carbon-containing solid and alters only its size, structure and strength. More particularly, carbon-containing granules filter carbon from the gas phase, hence allowing the synthesis gas produced to be removed from the reaction chamber largely free from particles of carbon. One embodiment of the process of the invention exploits the mechanism of carbon deposition by introducing the gaseous reactants into the reaction chamber with an atomic carbon/oxygen ratio C/O>1, meaning that, in addition to synthesis gas, carbon is specifically generated and is deposited on the carbon-containing solid. Alternatively, carbon can be removed from the solid if a carbon/oxygen ratio C/O<1 is set. In this way it is possible, for example, to take low-grade granules and, by specifically setting the density in the range from 0.7 to 1.4 $g/cm^3$, preferably from 0.8 to 1.4 $g/cm^3$, to produce a high-grade coke product which can be removed from the reaction chamber and used, for example, in a blast furnace.

In one preferred embodiment, thermal energy needed for the implementation of the process of the invention is generated by oxidation or partial oxidation of a fuel which comprises hydrocarbons and/or hydrogen. Oxidizing agents used are preferably air and/or oxygen-enriched air and/or technically pure oxygen. Oxidation or partial oxidation may be carried out outside the reaction chamber, by mixing the fuel with an oxidizing agent and reacting them. The hot gas which forms is then introduced into the reaction chamber and guided over the carbon-containing solid, giving up part of its perceptible heat to the carbon-containing solid and/or to the gases that are to be reacted. Alternatively, the oxidizing agent may be introduced into the reaction chamber and mixed therein with an existing fuel, and reacted. Where the carbon-containing solid comprises low-grade coking-plant coke based on brown coal, bituminous coal or biomass, from which pyrolysis gases may be given off at elevated temperature, then provision is made, for the purpose of energy recovery, to feed in oxygen after the pyrolysis zone and carry out at least partial oxidation of the pyrolysis gases.

In another embodiment, a hot gas is generated by means of an electrical heater which is arranged outside the reaction chamber, and through which a gas stream is guided and is heated with the aid of a light arc, before being introduced, at a temperature between 3000 K and 10 000 K, preferably between 4000 K and 10 000 K, into the high-temperature zone, where it gives up its heat to the reactant or reactants. The gas stream may consist, for example, of hydrogen obtained in the hydrocarbon decomposition procedure, this hydrogen being removed from the reaction chamber and, following possible cleaning (e.g. dedusting), being fed to the electrical heater and at least partly ionized.

In another preferred embodiment of the process of the invention, thermal energy is generated in the reaction chamber by electromagnetic induction. For this purpose, one or more electrically conductive elements are arranged in the reaction chamber in such a way that they are able to enter into thermal communication with the gases to be reacted and/or with the carbon-containing solid. Via an alternating electromagnetic field, eddy currents are generated in the electrically conductive elements, causing them to heat up. The heat generated in this way is transferred, directly or indirectly, to the gases to be reacted, and hence covers at least part of the energy demand required for the formation of synthesis gas. The electrically conductive element or elements are in a fixed arrangement in the reaction chamber and/or are distributed in granule form in the carbon-containing solid, more particularly in carbon-containing granules, and so are introduced into the reaction chamber and removed from the reaction chamber together with this carbon source. Alternatively, the impedance of the carbon-containing solid may be utilized for direct inductive heating.

It is also conceivable to generate thermal energy in the reaction chamber via an electrical current which is passed through the carbon-containing solid and heats it.

The energy to be provided in the process of the invention per mole of methane reacted is not more than 150 kJ, advantageously not more than 120 kJ, preferably not more than 100 kJ.

The thermal decomposition reaction of hydrocarbons in accordance with the invention is carried out advantageously under a pressure of between atmospheric pressure and 50 bar, preferably between 10 and 50 bar.

The residence time in the reaction zone during the decomposition reaction of the invention is advantageously 0.5 second to 25 minutes, preferably 1 to 60 seconds, more particularly 1 to 30 seconds.

The carbon-containing solid, more particularly the carbon-containing granules is or are preferably guided in the form of a moving bed through the reaction chamber, with methane and carbon dioxide being passed advantageously in countercurrent to the solid. For this purpose, the reaction chamber is rationally designed as a vertical shaft, which means that the movement of the moving bed comes about solely under the action of gravity. Flow through the moving bed is able to take place, advantageously, homogeneously and uniformly. It is also possible, however, for the carbon-containing solid to be guided as a fluidized bed through the reaction chamber. Both versions permit continuous or quasi-continuous operation.

Where the carbon-containing solid is guided as a moving bed through the reaction chamber, then, in one particularly preferred version of the process of the invention, it is introduced at ambient temperature into the reaction chamber, where it is first heated to a maximum temperature and subsequently cooled again, the maximum temperature being situated in a high-temperature zone in which temperatures in the region of 1000° C. prevail. Cooling may be carried out to a maximum of 500 K, preferably to 300 K, more preferably to 50 K, above the ambient temperature, meaning that there is no need to cool or quench the carbon-containing solid removed from the reaction chamber. In order to form and maintain the temperature profile described, a proposal is made to introduce a gas mixture at ambient temperature, comprising methane and carbon dioxide, into the reaction chamber and to guide it in countercurrent through the moving bed. On its path through the reaction chamber, the gas mixture exchanges heat in direct contact with the moving bed, with the gas mixture being heated to up to 1000° C. and the moving bed being simultaneously cooled. Hot synthesis gas formed in the high-temperature zone is guided further in countercurrent through the moving bed and is cooled in direct heat exchange with said bed, thus allowing hydrogen and carbon monoxide to be removed from the reaction chamber with a temperature in the vicinity of the ambient temperature. As a result of the high level of energy integration, it is possible to compensate the disadvantages in respect of overall energy demand that result from the absence of a specific, highly active catalyst. Thermal energy needed for the production of synthesis gas is generated more particularly in the high-temperature zone and/or introduced into the high-temperature zone. There is no intention, however, to rule out the generation and/or introduction of thermal energy at other locations in the reaction chamber.

The synthesis gas formed in the high-temperature zone should be cooled as rapidly as possible, thus making it possible to suppress the Boudouard reaction and the methanization effectively—here, on the one hand, carbon monoxide, carbon dioxide and carbon form methane, and, on the other hand, hydrogen and carbon, or hydrogen and carbon monoxide, form methane. In certain circumstances, the volume flow rate at which the moving bed is guided through the high-temperature zone is not sufficient for this purpose. In that case, the invention envisages a circuit formed from carbon-containing granules, with some of the synthesis gas formed in the high-temperature zone being guided in countercurrent through this circuit and being cooled in the process. Likewise possible is the use of a heat-exchange tube via which heat is removed from the synthesis gas. Heat removed via the granule circuit and heat removed via the heat-exchange tube can be utilized for the preheating of reactants.

The grains of which the carbon-containing granules removed from the reaction chamber are composed exhibit scatter in their grain size and in their density, thus ruling out the possibility of utilizing the granules directly, as blast furnace coke, for example, for which a grain size between 35 and 80 mm is required. In accordance with the invention, therefore, provision is made to classify, by sieving and/or classifying and/or screening, the carbon-containing granules removed from the reaction chamber. Grains which lie within the required specification are discharged as product. Grains whose diameter is too small or whose density is too low for the intended application are preferably returned either to the same reaction chamber or to a reaction chamber operated in parallel, Grains with excessive diameters are crushed before being returned, and the fine fraction is returned.

For producing high-purity synthesis gas it may be necessary to clean substance streams that are to be introduced into the reaction chamber, to remove substances which are themselves unwanted in the synthesis gas or which may be converted within the reaction chamber into unwanted substances. Additionally or alternatively it is also possible to remove unwanted substances from the gases removed from the reaction Chamber. The unwanted substances include, for example, sulphur compounds, monocyclic or polycyclic aromatics, such as benzene, toluene, xylene and/or naphthalene, for example, and also other hydrocarbons, which may be present in natural gas among other feedstocks.

In one embodiment of the process of the invention, therefore, a gas occurring in the process is cleaned by being passed through a coke bed, in the course of which it is freed from substances which are themselves unwanted in the synthesis gas or may be converted into unwanted substances in the reaction chamber. Depending on its quality, the coke laden with unwanted substances in the course of gas cleaning may be disposed of by burning or may be supplied as input to a coking plant.

The process of the invention is suitable more particularly for the conversion of natural gas into synthesis gas, where the methane fraction in the natural gas, depending on the natural gas deposit, is typically between 75% and 99% of the molar fraction. In this case, carbon dioxide and natural gas may be introduced together or separately at at least one location into the reaction chamber. Also possible, however, is the reaction of coupled gases such as coke oven gas and/or converter gas and/or gases from cupola furnaces, which comprise both methane and carbon dioxide. Especially suitable are furnace gases from cupola furnaces which are operated with technically pure oxygen or with air which is enriched with oxygen. On account of its low nitrogen content, the furnace gas obtained in this case contains relatively high fractions of carbon monoxide and carbon dioxide.

In contrast to the prior art, it is possible when implementing the process of the invention to prepare a synthesis gas without a significant solids loading.

Although the temperature ranges according to the invention are above the ranges stated in the prior art, this is not an economic disadvantage, since the process version of the invention that is described here entails a hitherto unachieved degree of heat recovery.

In the text below, the invention will be elucidated in more detail by means of a working example which is depicted schematically in FIG. 1.

FIG. 1 shows a version of the process of the invention in which methane and carbon dioxide are reacted in a continuous operation to give synthesis gas and a carbon product, for example injection coal for a blast furnace.

Via the feed line 1, carbon-containing granules, comprising, for example, coke breeze, are introduced at ambient temperature from above into the reaction chamber R, through which the granules are subsequently guided downwards under the action of gravity into a moving bed W. A methane-containing gas 2, comprising, for example, a mixture of natural gas and carbon dioxide, is passed simultaneously from below into the reaction chamber R and is guided upwards in countercurrent through the moving bed W. The gas 2, which on entry into the reaction chamber R has ambient temperature, is heated on its path upwards in direct heat exchange with the moving bed W. The primary reaction in the high-temperature zone H, in which temperatures of more than 100° C. prevail, is that of methane and carbon dioxide to give hydrogen and carbon monoxide, thus forming a synthesis gas. As a result of thermal decomposition of methane and the Boudouard reaction, however, carbon is formed as well, and accumulates to an extent of more than 95% on the carbon-containing grains of the moving bed W. The hot synthesis gas formed continues to flow upwards, and is cooled in direct heat exchange with the moving bed W, allowing the removal, via line 3, of synthesis gas at a temperature which is above the ambient temperature but is at least 500 K below the reaction temperature. In the separating device T, hydrogen 4 is removed from the synthesis gas, and is subsequently converted in the electrical heater P, with the aid of light arc, into a hot gas 5. With a temperature of between 3000 and 10 000 K, the hot gas 5 is passed into the high-temperature zone H, where it provides the energy needed for synthesis gas production. At the bottom end of the reaction chamber R, granules 6 are removed, and, on the basis of the accumulations with high carbon content and low ash content and sulphur content, can be used, for example, as a coking-plant adjuvant or carburizing agent of alloyed cast iron in foundries. Components of the granules 6 that do not meet the quality requirements, because they have a diameter which is too large or too small or have a density which is too low, for example, are removed in the separating device S by sieving and/or classifying and/or screening, and, after possible comminution, are returned to the reaction chamber R via line 7. The residue 8 which remains is blast furnace coke, which is delivered as a high-grade product.

The invention claimed is:

1. A process for producing synthesis gas, comprising:
   introducing methane and carbon dioxide as gaseous reactants into a reaction chamber and reacting methane and carbon dioxide in said reaction chamber in a bed of carbon-containing solids to give a gaseous product stream containing hydrogen and carbon monoxide,
   wherein said bed is guided through said reaction chamber as a moving bed, and the synthesis gas formed in said reaction chamber flows upward countercurrent to said moving bed and is cooled by direct heat exchange with said carbon-containing solids, and
   wherein said moving bed flows through said reaction chamber solely under the action of gravity.

2. The process according to claim 1, wherein methane and carbon dioxide are reacted in said reaction chamber at temperatures between 800 to 1600° C.

3. The process according to claim 1, wherein said carbon-containing solids of said moving bed are carbon-containing granules comprising at least 80% by weight carbon and having a grain size of 0.1 to 100 mm.

4. The process according to claim 1, wherein the oxygen/carbon ratio of the gaseous reactants is set so that carbon is formed in the reaction chamber.

5. The process according claim 1, wherein at least some of the thermal energy required for synthesis gas production is generated in the reaction chamber.

6. The process according to claim 1, wherein said moving bed is guided continuously through the reaction chamber.

7. The process according to claim 1, wherein the synthesis gas formed in the reaction chamber is additionally cooled via a circuit formed from carbon-containing solid.

8. The process according to claim 1, wherein the synthesis gas formed in the reaction chamber is additionally cooled via a heat-exchange tube.

9. The process according to claim 1, wherein said carbon-containing solids are granules of low-grade coking-plant coke and/or coke breeze.

10. The process according to claim 3, wherein some of the carbon-containing granules removed from the reaction chamber are returned to the reaction chamber.

11. The process according to claim 1, wherein natural gas and/or coking-oven gas and/or converter gas and/or furnace gas from cupola furnaces or blast furnaces are introduced at at least one location into the reaction chamber and are reacted to give synthesis gas.

12. The process according to claim 1, wherein a gas which occurs in the process is cleaned of unwanted substances by being passed through a coke bed.

13. The process according to claim 1, wherein said process is carried out continuously.

14. The process according to claim 1, wherein the oxygen/carbon ratio of the gaseous reactants is set so that carbon is removed from the carbon-containing solids.

15. The process according claim 1, wherein at least some of the thermal energy required for synthesis gas production is introduced into the reaction chamber via a hot gas.

16. The process according claim 5, wherein at least some of the thermal energy required for synthesis gas production is introduced into the reaction chamber via a hot gas.

17. The process according to claim 1, wherein said carbon-containing solids are granules of coke based on bituminous coal and/or coke obtained from biomass.

18. The process according to claim 1, wherein thermal energy for reacting methane and carbon dioxide in said reaction chamber is generated by oxidation or partial oxidation of a fuel which comprises hydrocarbons and/or hydrogen outside the reaction chamber to form a heated gas, and the heated gas formed is introduced into the reaction chamber and guided over the carbon-containing solids.

19. The process according to claim 1, wherein thermal energy for reacting methane and carbon dioxide in said reaction chamber is provided by a hot gas that is generated by guiding a gas stream through an electrical heater arranged outside the reaction chamber whereby the gas stream is heated with the aid of a light arc, and the gas stream is then introduced, at a temperature between 3000 K and 10 000 K, into the reaction chamber.

* * * * *